United States Patent
Horstmann

[11] Patent Number: 6,055,503
[45] Date of Patent: Apr. 25, 2000

[54] SOFTWARE PROGRAM SELF-MODIFICATION

[75] Inventor: Cay S. Horstmann, Cupertino, Calif.

[73] Assignee: Preview Systems, Cupertino, Calif.

[21] Appl. No.: 08/921,402

[22] Filed: Aug. 29, 1997

[51] Int. Cl.$^7$ .............................. G06F 9/445; H04L 9/00
[52] U.S. Cl. .................... 705/1; 380/4; 395/712
[58] Field of Search .................... 705/1, 14; 395/701, 395/703, 712, 186; 380/4, 23, 24, 25, 8, 9, 49; 713/1, 2, 100

[56] References Cited

U.S. PATENT DOCUMENTS

| | | | |
|---|---|---|---|
| 5,327,563 | 7/1994 | Singh | 380/4 |
| 5,341,429 | 8/1994 | Stringer et al. | 380/23 |
| 5,421,006 | 5/1995 | Jablon et al. | 714/36 |
| 5,613,089 | 3/1997 | Hornbuckle | 711/164 |
| 5,642,417 | 6/1997 | Stringer | 380/4 |
| 5,764,992 | 6/1998 | Kullick et al. | 395/712 |
| 5,838,981 | 11/1998 | Gotoh | 395/712 |
| 5,867,647 | 2/1999 | Haigh et al. | 713/200 |

*Primary Examiner*—James P. Trammell
*Assistant Examiner*—Demetra R. Smith
*Attorney, Agent, or Firm*—Burns, Doane, Swecker & Mathis LLP

[57] ABSTRACT

The present invention, generally speaking, provides a mechanism for modifying an executable upon first execution. Various modifications may be made to the executable, including modifications useful for purposes of electronic software distribution, such as attaching a unique serial number, encrypting or decrypting the executable, or adding protection code (license enforcement code) to the executable. A Rewriter Module performs the actual modification. First, a copy of the executable is made. The copy is then run and the original executable is deleted. Then a second copy of the executable is made using the name of the original executable, and the first copy is deleted. During one or both of the copying steps, modifications are made to the executable. The modifications may be modifications useful for purposes of electronic software distribution, especially Try/Buy. When a software product is purchased, the foregoing process may be reversed, leaving the executable in its original "pristine" condition. All of the foregoing activity is transparent to the user.

7 Claims, 3 Drawing Sheets

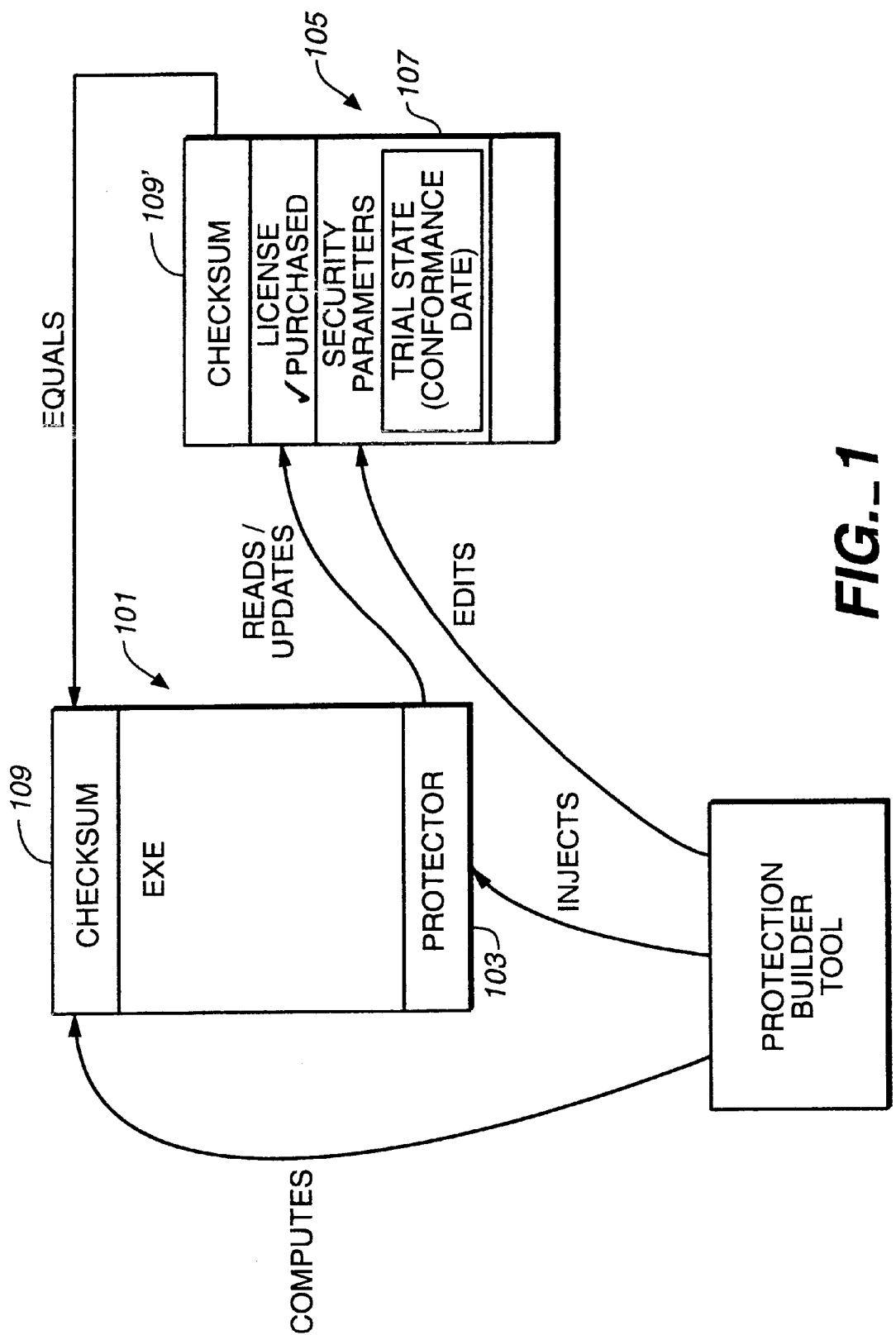
FIG._1

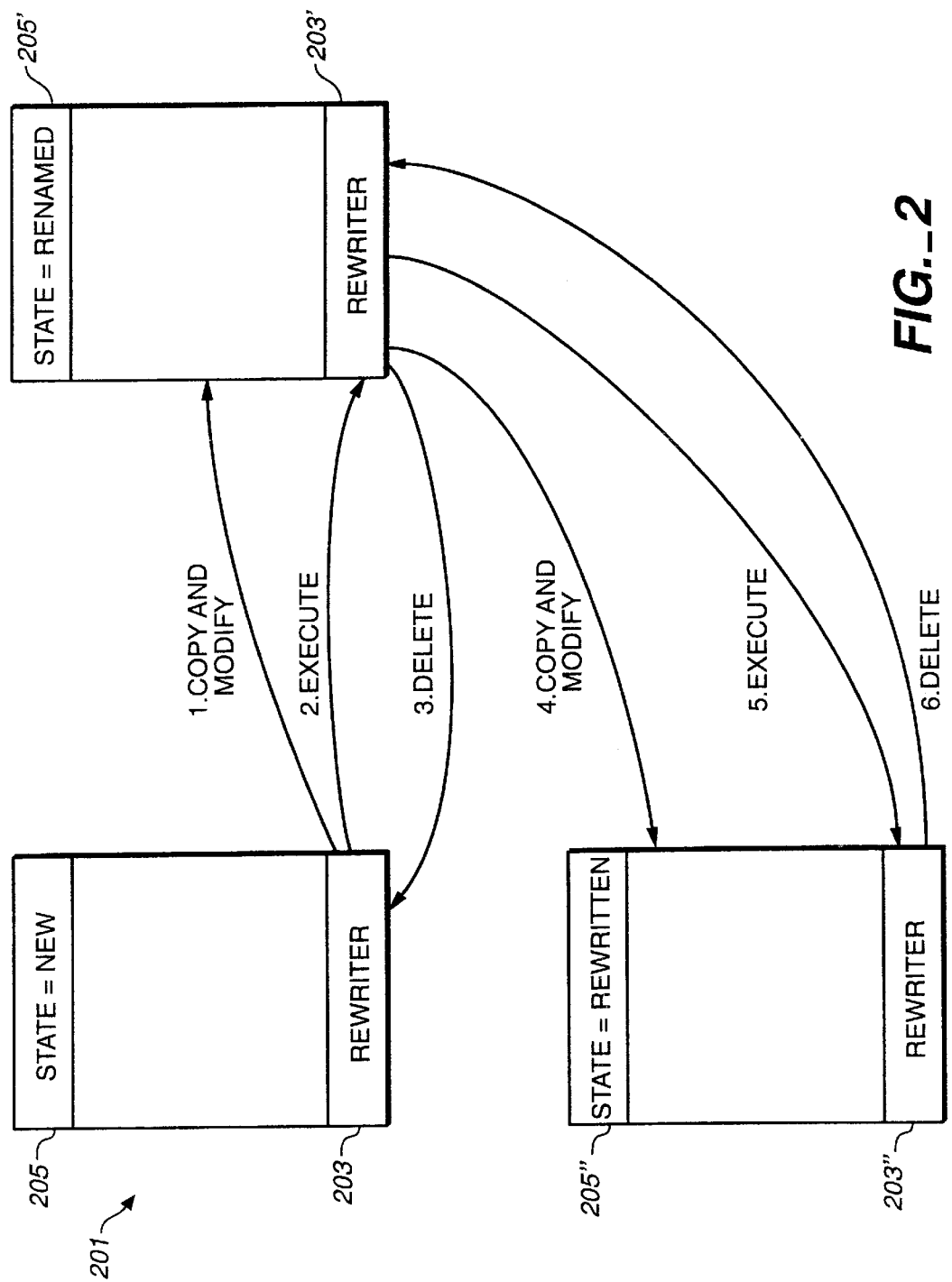
FIG._2

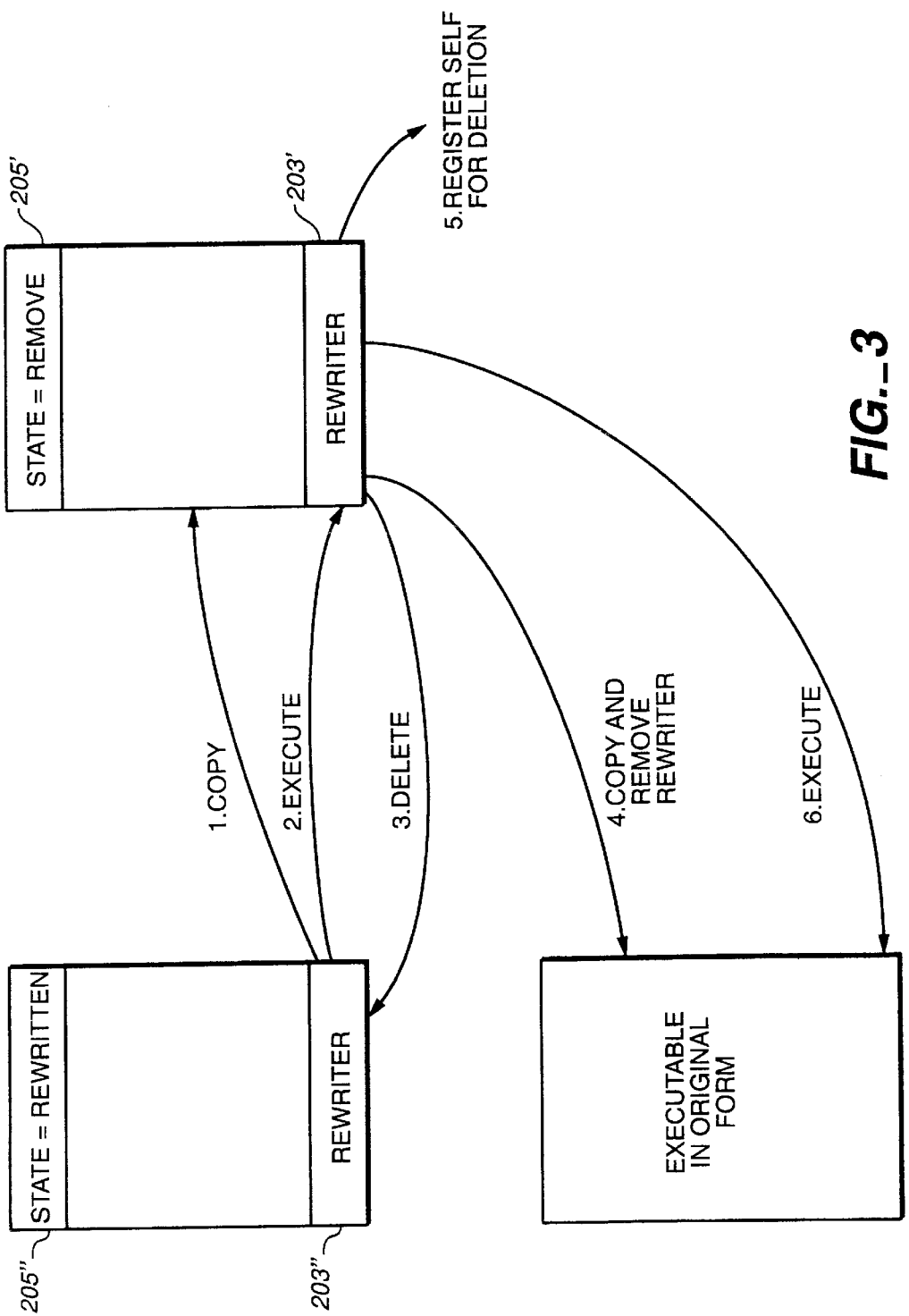

SOFTWARE PROGRAM SELF-MODIFICATION

BACKGROUND OF THE INVENTION

1. Field of the Invention

The present invention relates in general to software distribution.

2. State of the Art

Modern operating systems typically do not allow a program to modify itself. Once a program has been installed on a computer system, there is typically no need for the program to modify itself. Hence, the foregoing limitation has not been sorely felt. In software distribution, however, particularly electronic software distribution, in many instances the ability of a program to modify itself would be very advantageous. For example, if a program were able to modify itself, it could perform its own serialization and installation. The software distribution process, from the point of view of both the software publisher and the software user, could be simplified significantly. Furthermore, self-adaptive software programs may also be envisioned wherein the software program, instead of remaining static, performs intelligence gathering and changes itself over the course of time in accordance with the gathered intelligence.

The present invention addresses and overcome the foregoing limitation, allowing software programs to, in effect, modify themselves.

SUMMARY OF THE INVENTION

The present invention, generally speaking, provides for self-modification of a software program. Self-modification may be used to allow the software program itself to perform tasks associated with a final phase of software distribution, including, for example, program installation, serialization, etc. Various modifications may be made to the executable, such as attaching a unique serial number, encrypting the executable, or adding protection code (license enforcement code) to the executable. A Rewriter Module performs the actual modification. First, a copy of the executable is made. The copy is then run and the original executable is deleted. Then a second copy of the executable is made using the name of the original executable, and the first copy is deleted. During one or both of the copying steps, modifications are made to the executable. The modifications may be modifications useful for purposes of electronic software distribution, especially Try/Buy. When a software product is purchased, the foregoing process may be reversed, leaving the executable in its original "pristine" condition. All of the foregoing activity is transparent to the user.

BRIEF DESCRIPTION OF THE DRAWING

The present invention may be further understood from the following description in conjunction with the appended drawing. In the drawing:

FIG. 1 is a block diagram illustrating one possible application of the present invention;

FIG. 2 is a block diagram illustrating a manner of automatic software copy self-modification in accordance with the present invention; and FIG. 3 is a block diagram illustrating a manner of automatic software copy self-modification in which prior modifications are stripped out and the software restored to its original form.

DETAILED DESCRIPTION OF THE PREFERRED EMBODIMENTS

Automatic software copy self-modification in accordance with the present invention may be used in various ways. One application of automatic software self-modification, to electronic software distribution and license enforcement, will first be described, after which the mechanism whereby automatic software copy self-modification is achieved will be described. Further details regarding electronic software distribution and software protection, respectively, may be found in U.S. application Ser. Nos. and (Atty. Dkt. Nos. 031994-002 and 031994-003), filed on even date herewith and incorporated herein by reference.

Software license enforcement typically relies on some sort of binding being created between a license file and an executable file. Referring to FIG. 1, an executable file 101 has been "injected" with a code module 103, referred to herein as the Protector Module, that allows or disallows use of a Try/Buy-distributed software product based on the "trial state," i.e., usage information used to determine whether further trial should be allowed. Trial parameters governing trial are stored in a license file 105 which the Protector reads in order to determine if a particular attempted use should be allowed or disallowed. The license file also contains security parameters 107 that determine what trial protection security measures are to be applied. Injection of an executable with protection code is itself known. Code may also be attached to a software product using other mechanisms, for example compiling the code into the executable.

One binding mechanism used for license enforcement is executable binding, also known as application binding. Executable binding may be used to protect against a recombination attack in which a license file taken from a purchased copy of the software product is disseminated. By combining such a license file with a trial copy of the software product, the equivalent of a paid-up copy may be obtained. The license file will typically contain a warning against this type of misappropriation and will further display the name and address of the "true" license holder. However, because the purchaser supplies the latter information and there is no practical way to check its authenticity, it may easily be faked.

In executable binding, when an executable is installed, a unique identifier, e.g. a checksum 109, is attached to it and is also stored in (or is derivable from) the license file. That is, every time the executable is installed, it gets a different "branding." To protect against a recombination attack of the type described, the Protector 103 compares the unique identifier 109 of the executable with the unique identifier 109' of the license. If the two do not match, access is disallowed.

Another application of self-modification involves updating a product identification code that is embedded in the executable code subsequent to the user executing a purchase module so that the updated product code reflects the purchase.

Having described applications of automatic software self-modification (electronic software distribution and license enforcement), the mechanism whereby automatic software copy self-modification is achieved will now be described. Referring to FIG. 2, in order to accomplish automatic software copy self-modification, an executable 201 has attached thereto a Rewriter Module 203. (The Rewriter Module 203 may form part of the Protector Module 103 of FIG. 1.) A pointer designating an execution starting point has been changed to point to the Rewriter Module 203. Also attached to the executable 201 is a state indicator 205. The state indicator 205 initially indicates a NEW state.

The first time the Rewriter Module 203 is executed, it causes the following series of events to occur:

1. The Rewriter Module 203 causes the executable to be copied, e.g. from PROG.EXE to PROG1.EXE. Because an executing program is typically read-only, changes to that program can only be made by making a copy of the program. Modifications to the executable may be made during this step. The state indicator 205' is changed to the RENAMED state.
2. The Rewriter Module 203 causes the Rewriter Module 203' to run.
3. The Rewriter Module 203' causes the original executable to be deleted. As a result, the name of the original executable is made available within the computer's file system.
4. The copy of the executable is again copied, e.g. from PROG1.EXE to PROG.EXE, resulting in a new executable having the original name. Modifications to the executable may be made during this step. The state indicator 205" is changed to the REWRITTEN state.
5. The Rewriter Module 203' causes the Rewriter Module 203" to run. 6. The Rewriter Module 203" causes the copy to be deleted.

During one or both of the copying steps 1 and 4, changes are made to the executable. These changes may include such things as attaching a unique serial number, encrypting or decrypting the executable, adding additional protector code to the Protector Module, etc. By referring to the state indicator, the Rewriter Module, as it is executed in the foregoing sequence of steps, is able to detect the current state of the executable and the appropriate next steps to be performed. The foregoing steps are all transparent to the user of the program.

Upon purchase of the software product, the Rewriter may be used to reverse the foregoing sequence of steps to strip out the previous modification and leave the executable in its original "pristine" form. That is, each time the software product is used, the Rewriter Module is executed and checks the license file to see if the software product has been purchased. When the Rewriter Module finds that the software product has been purchased, it strips out previous modifications and changes the pointer to start execution at the start of the original program. The Rewriter Module itself is deleted during this process.

Referring more particularly to FIG. 3, the process of stripping out previous modifications involves the following steps:

1. With the executable in the REWRITTEN state, the Rewriter Module 203" causes the executable to be copied, e.g. from PROG.EXE to PROG1.EXE. The state indicator 205' is changed to the REMOVE state.
2. The Rewriter Module 203" causes the Rewriter Module 203' to run.
3. The Rewriter Module 203' causes the rewritten executable to be deleted. As a result, the name of the original executable is made available within the computer's file system.
4. The copy of the executable is again copied, e.g. from PROG1.EXE to PROG.EXE, resulting in a new executable having the original name. During this step, previous modifications are reversed, and the Rewriter Module and the state indicator are stripped out, leaving only the original executable program.
5. The Rewriter Module 203' schedules itself with the operation system for deletion.

The same type of process may be used to create a self-installing software product. Typically, in order to install a software product, the user identifies and runs an installer provided along with the software product. In the case of a self-installing software product in accordance with one aspect of the invention, installation is accomplished without requiring the user to so much as be aware that there is such a thing as installation. When the user first runs the software product, the Rewriter Module performs installation, writing various files to their appropriate locations, performs any desired modifications to the software product, and then runs the software product.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A method of modifying a software product upon use, comprising the steps of:

attaching a rewriter module to the software product such that when use of the software product is first attempted, the rewriter module is executed;

producing a copy of the software product by copying the software product to a file having a different filename than an original filename of the software product;

running the copy of the software product and deleting the original software product;

copying the copy of the software product to a file having the original filename; and during at least one of said copying steps, modifying the software product.

2. The method of claim 1, wherein modifying comprises assigning or updating a unique identifier to the software product.

3. The method of claim 1, wherein modifying comprises encrypting or decrypting the software product.

4. The method of claim 1, wherein modifying comprises compressing or decompressing the software product.

5. The method of claim 1, wherein modifying comprises adding code to the software product.

6. The method of claim 5, comprising adding license enforcement code to the software product.

7. The method of claim 1, wherein modifying comprises stripping out prior modifications to the software product.

* * * * *